United States Patent [19]

Singer

[11] 4,396,637

[45] Aug. 2, 1983

[54] POWDERED GLUTEN COMPOSITION, PROCESSES FOR THE PRODUCTION THEREOF AND USES THEREFOR

[75] Inventor: Norman S. Singer, London, Canada

[73] Assignee: John Labatt Limited, London, Canada

[21] Appl. No.: 152,026

[22] Filed: Dec. 4, 1980

Related U.S. Application Data

[63] Continuation of Ser. No. 896,938, May 7, 1978, abandoned.

[51] Int. Cl.$^3$ ............................ A21D 2/26; A23J 3/00
[52] U.S. Cl. .................................... 426/549; 426/653; 426/656; 426/429; 426/438; 426/465; 426/486
[58] Field of Search ............... 426/549, 615, 656, 429, 426/442, 653, 438, 465, 486; 260/112 G

[56] References Cited

U.S. PATENT DOCUMENTS 3,463,770  8/1969  Fellers ........................... 426/656 X

FOREIGN PATENT DOCUMENTS 582611  11/1946  United Kingdom ................ 426/429
1083368  9/1967  United Kingdom .

*Primary Examiner*—Robert A. Yoncoskie
*Attorney, Agent, or Firm*—Fisher, Christen & Sabol

[57] ABSTRACT

A dry modified vital gluten composition which includes vital gluten modified by dispersing wet vital gluten in a food grade hydrophobic liquid in the presence of an edible emulsifier, reducing the pressure, elevating the temperature to about 65° C. in a short period of time and separating the dried particulate gluten from the liquid, whereby the gluten is dehydrated and rendered substantially odorless, tasteless and more functional.

12 Claims, 7 Drawing Figures

POWDERED GLUTEN COMPOSITION, PROCESSES FOR THE PRODUCTION THEREOF AND USES THEREFOR

This is a continuation of application Ser. No. 896,938, filed May 17, 1978, now abandoned.

FIELD OF INVENTION

The present invention relates generally to a novel gluten product, processes for obtaining same and various uses thereof. More particularly, the invention is concerned with a vital wheat product which has improved functionality and more importantly has significantly reduced odour and flavour characteristics than vital wheat gluten produced by known processes, the product thereby being able to be utilized in many applications heretofore not open to normal vital wheat gluten.

DESCRIPTION OF THE PRIOR ART

Vital wheat gluten (sometimes referred hereinafter for convenience simply as "gluten") is a concentrated natural protein and as obtained by most known processes, takes the form of a light tan powder having a typical flavour and odour. The odour has been described as "cereal", "cardboardy" or most commonly, as "painty". The actual intensity of this typical gluten odour will vary with feedstock and processing conditions as well as length and conditions of storage. The flavour of wheat gluten, although in basic terms not strong is still strong enough to prohibit its use in many applications such as mild-flavoured non-bakery products as imitation cheese, fish sausage, meat binders, meat extenders, reformed rice and high protein beverage mixes. Gluten itself comprises 75-80% protein, 5-8% lipids and related compounds, some fibre, residual starch, a small amount of minerals and from about 4-10% residual moisture. It is usually insoluble in neutral aqueous solutions, i.e. those having a pH of from about 4 to about 8.

For commercial purposes, gluten is presently manufactured by one of many washing procedures-refer for example to U.S. Pat. No. 3,669,739 and U.S. Pat. No. 2,555,908 wherein gluten is washed from wheat-flour and dried by conventional means and has the typical odour and flavour referred to above. The actual intensity of this odour varies with feedstock and processing conditions and intensification of the odour has been observed in gluten stored for relatively short periods such as six months even in good storage conditions. Under adverse storage conditions the problem will be even more pronounced. Many attempts have been made to expand the area of use of gluten by providing a gluten wherein the undesirable odour and/or flavour is reduced but such attempts have met with little success. A major reason for this is that wet gluten is a tough, rubbery material which is extremely heat-sensitive. Consequently, relatively mild drying conditions must be utilized, otherwise the gluten functionality is impaired or even totally lost. Many common industrial drying procedures such as drum or spray drying are therefore not generally utilizable without series chemical modification such as cleavage of disulfide bonds. One widely used drying process uses a "ring drier". In this method fresh wet gluten is injected directly into a high-torque disintegrator wherein it is reduced to relatively small particles and simultaneously coated with smaller dry and partially dry particles. The particles are then transported in a constantly renewed turbulent stream of hot air in an enclosed ring-like circuit. Fine dry gluten particles are withdrawn from the system by means of a centrifugal classifier which is capable of separating dry fine particles whilst holding moist particles in prolonged circulation.

Obviously, the control of temperature in such a system is critical if denaturization of the gluten is to be avoided. In common with other known drying methods the gluten obtained retains the characteristic flavour and odour referred to above. Many processes have been suggested whereby the odour and/or taste may be removed from the gluten (which generally contains about 6% moisture). For example, there are processes which involve treating conventionally dried gluten with various organic solvents. One such process is taught in U.S. Pat. No. 3,840,515 wherein gluten is treated with anhydrous methanol. This treatment is alleged to provide a relatively colourless product, reduce the "feedy" flavour and oil content. Removal of the oil would, in fact, greatly reduce the odour which is attributable to the oil. However, solvents such as anhydrous methanol under such conditions will remove only the "free" liquid which is only a minor proportion of the total gluten oils and hence will not materially reduce the undesirable odour, etc. Consequently, its use in (non-bakery) applications wherein there is no masking of the taste, are still precluded. It has been reported that when stronger polar solvents are used whilst virtually all of the odour-imparting oils (lipids) may be removed, the gluten functionality is irretrievably lost and the resulting product is thus severely restricted in practical application.

There exist alternative known methods for drying heat sensitive materials such as the process disclosed in U.S. Pat. No. 3,567,469. This process generally involves the dehydration of "mushy" materials which may contain a high percentage of intra- and/or intercellular water, such as tomato or avocado pulp, by dispersing the material in particulate form in a hydrophobic edible liquid and subjecting the dispersion to reduced pressure at an elevated temperature in the form of a thin film and thereafter recovering a slurry of the dehydrated particles in the liquid. The process provides, however, the obtainment of a dehydrated product which has substantially retained the properties, particularly organoleptic properties, that it had prior to dehydration. The process provides further the obtainment of a dehydrated product having a more pronounced flavour compared to the original product.

SUMMARY OF THE INVENTION

Broadly stated, it has now been found, and this finding forms the basis for the present invention, that by modifying vital wheat gluten by the dehydration process embodiment of this invention, the resulting product has significantly reduced odour and flavour characteristics and improved functionality compared to gluten produced by known processes thereby allowing the product a substantially broader ambit of application.

A primary object of this invention, therefore, is to provide a novel gluten product of significantly reduced organoleptic properties, i.e. odour and taste.

A further object of this invention is to provide a novel gluten product of improved storage or shelf-life.

Another object of this invention is to provide a novel gluten product of improved functionality.

Yet a further object of this invention is to provide a relatively simple and economical method of processing gluten powder in order to achieve such a product.

Additional objects and features of this invention will appear from the description which follows in which reference will be made to the accompanying drawings identified hereinafter.

In fulfilment of the foregoing and related objects, this invention provides a dry modified vital gluten composition comprising vital gluten modified by dispersing wet vital gluten in a food grade hydrophobic liquid in the presence of an edible emulsifier, reducing the pressure, elevating the temperature to about 65° C. for a short period of time and thereafter separating the dried particulate gluten from said liquid, whereby the gluten is dehydrated and rendered substantially odourless, tasteless and more functional.

This product, as will be discussed in more detail hereinafter, possesses further characteristics which distinguish it from ordinary powdered gluten and provide advantages in the use of the product in, inter alia, baking processes.

In a process embodiment of this invention, wet vital gluten is dehydrated and modified by dispersing wet gluten in a food grade hydrophobic liquid in the presence of an edible emulsifier, reducing the pressure, elevating the temperature up to about 65° C. for a short period of time and thereafter separating the gluten particles from the liqid to obtain the desired product. The exact mechanism by which the process of this invention effects the modification of the wet gluten is not fully known and is not required to comprehend or work the present invention.

DETAILED DESCRIPTION OF THE INVENTION

The wet vital gluten starting material to be used in the present process may vary greatly with respect to solids content, but for obvious practical reasons the solids content should not exceed 45% by weight. Preferably the solids content is in the range of 20-35%. Conveniently, the gluten starting material may be used directly from a standard washing method of extracting gluten from wheat flour as described hereinbefore, wherein the moisture content of such wet vital gluten would normally be in the range of 60-70%.

As a hydrophobic carrier liquid, any edible vegetable oil, such as cottonseed or corn oil, may be employed therefor as is known from the prior art. Also light weight mineral oils (e.g. Isopar H available from Esso Chemicals) whose boiling point is sufficiently higher than that of water, e.g. about >10° C. may be used.

By utilizing a mineral oil or a stabilized vegetable oil as a carrier liquid, the resulting product has exhibited a storage or shelf-life two to four times greater than that of regular gluten products.

The ratio of carrier oil:gluten solids content may be from about 15:1 to 5:1, preferably 9:1. While a ratio higher than 5:1 may be used satisfactorily, such a ratio is not warranted from an economic viewpoint. On the other hand, a ratio less than 5:1 would tend to foul the apparatus (described hereinafter) and provide a completely unsatisfactory product, if any.

An essential requirement to maintain a stable, non-fouling water-in-oil dispersion is the use of an edible emulsifier such as an edible polyglycerol ester. A satisfactory dispersion was obtained employing Drewpol 10-4-0 or Drewpol 10-10-0 which are polyglycerol esters commonly used for preparing water-in-oil emulsions and are available from Universal Oil Products. The dispersion is effected by high speed/shear mixing at a range of about 1,000 r.p.m. for about 10 to 60 seconds. Preferably, drying of the dispersion is carried out at 3,000 to 4,000 r.p.m. for about 75 to 50 minutes. It will be obvious to the skilled worker that the drying time is to a large extent dependent upon the rate of high speed/shear mixing.

On achieving the dispersion, the pressure is reduced to facilitate dehydration and removal of any volatiles not retained in the carrier liquid. A reduced pressure to about 28 in. Hg was found to provide a satisfactory product. If necessary or desired, the pressure may be reduced during formation of the dispersion to minimize or substantially eliminate the possibility of any detrimental oxidation reactions occurring.

An increase in reaction temperature to below the thermal denaturation point of gluten, i.e. about 65° C., affords satisfactory results, with a reaction temperature of up to about 60° C. being preferred. While the temperature may be raised simultaneously with the reduction in pressure, it is preferred that the temperature be increased following pressure reduction so that the gluten has already been partially dehydrated thereby minimizing the possibility of any localized thermal denaturation. The dehydration may generally be accomplished within about 40 minutes, the desired product being achievable within as little as 25 minutes under the above-stated reaction conditions.

Following the dehydration of the gluten, the resulting particles of modified gluten may be separated from the carrier liquid by any appropriate known procedure, e.g. centrifugation, whereby the modified gluten is obtained containing about 15-50% residual carrier liquid by weight (depending on the type of carrier liquid and means of extracting the dried particulate gluten that is employed) and 4-10% residual moisture by weight. In some cases residual carrier oil is desirable in that it may add or enhance desirable organoleptic or functional properties. In such circumstances the type of carrier liquid used is obviously of greater importance.

Where it is necessary or desired to obtain a gluten product containing less than about 15% residual carrier liquid, the carrier liquid may, if it is of a lighter molecular weight, (e.g. mineral oil Isopar H) be extracted to a desired level by a standard method such as steam-stripping under vacuum. If the carrier liquid used is, for example, a vegetable oil, then the gluten composition obtained therefrom should be rewashed and extracted using any known suitable solvent, e.g. using hexane, freon or Isopar C (a low molecular weight oil available from Esso Chemicals Canada) and thereafter removing the solvent by, say, steam-stripping as mentioned above. Therefore, it will be obvious from the above that when it is necessary or desired to achieve the product of the present invention having a residual carrier liquid content below about 15%, it is preferred that the carrier liquid by a lower molecular weight liquid whose boiling point is sufficiently higher than that of water as mentioned hereinbefore.

The simple, laboratory scale apparatus employed in the preparation of the product of the invention is shown schematically in FIG. 1. With reference to FIG. 1 the apparatus comprised a jacketted Prodex mixer (Model JSS) 1 modified by the addition of cutter blades. The mixer is connected to a "QVF" condensor 2 (Corning Glass). The system is maintained under reduced pressure by vacuum pump 3. It was found that evacuation to below about 25 in. Hg provided generally an unsatisfactory product under the reaction condition stated herein. The system may be connected directly to any known suitable centrifuge (not shown) via outlet conduit 4. It will be appreciated that exact nature of the apparatus or system is not overly important provided same is able to fulfil all process requirements set forth herein in a satisfactory manner.

The invention is further described in the following examples, which are merely illustrative and are not intended to limit the scope of the invention, except as such limitations may appear in the appended claims.

EXAMPLE 1

Preparation of the modified gluten product

2970 Gm Durkex 500 vegetable oil (Glidden Durkex Division of SCM), 30 gm Drewpol 10-4-0 emulsifier and 1,000 gm wet regular vital wheat gluten having a moisture content of 67% Prodex mixer Model JSS (Koehring Corp.) modified by the addition of cutter blades and whose jacket was preheated to 50° C. Mixing at a rate of 3,800 r.p.m. for 30 seconds was effected to form a dispersion while evacuating to 28 in. Hg. The mixing was continued for 25 minutes whereafter the temperature of the mixer was increased to 60° C. for 15 minutes, still under continuous mixing. Thereafter, mixing was arrested, vacuum broken and the resulting oil slurry decanted. The oil slurry was then centrifuged at 4,000 r.p.m. for 10 minutes to remove the particulate gluten. The so-obtained gluten contained about 35% residual oil and about 6.2% residual moisture.

EXAMPLE 2

This example serves to depict how the residual carrier liquid of the gluten product obtained following the hydration process may be reduced to any desired level.

500 Gm of the gluten product obtained by the process according to Example 1 was added to 1,500 gm Isopar C (Esso Chemicals Canada) and the mixture added to the Prodex mixer preheated to 60° C. Mixing was carried out at 3,800 r.p.m. for 5 minutes. The slurry so-obtained was decanted and quickly filtered through a vacuum flask. The resulting free flowing gluten particles were then steam-stripped under vacuum to remove the residual Isopar C.

Functional Properties

The functional properties of the novel product of this invention were compared to other, commercially available gluten products by examining the gluten development in model dough systems and also by baking tests.

A. Model Dough Systems

"Synthetic flours" were prepared by dry-blending gluten products into "A" quality wheat starch sufficient to yield 14% protein on a dry solids basis.

The flours were then wetted (with a sufficient qantity of water to yield doughs of 35% total moisture) in a Farinograph sigma-blade, mixing bowl mounted on a Haake torque-sensing drive of a Haake-Brabender Farinograph. (The Farinograph is an instrument widely used in the flour industry to determine the basic mixing and rheological characteristics of a flour-water dough system. It follows that if a substance modifies the characteristics of a dough, such modification will be reflected in the resulting Farinogram as the change in dough viscosity.) Mixing was continued at 100 r.p.m. for about five minutes beyond the peak of development (when maximum viscosity is achieved). The viscosity profiles were traced at a chart speed of 1 in./minute wherein full scale deflection was equal to 5 Mkg.

The resulting Farinograms are shown as FIGS. 2-7.

Figure 1:
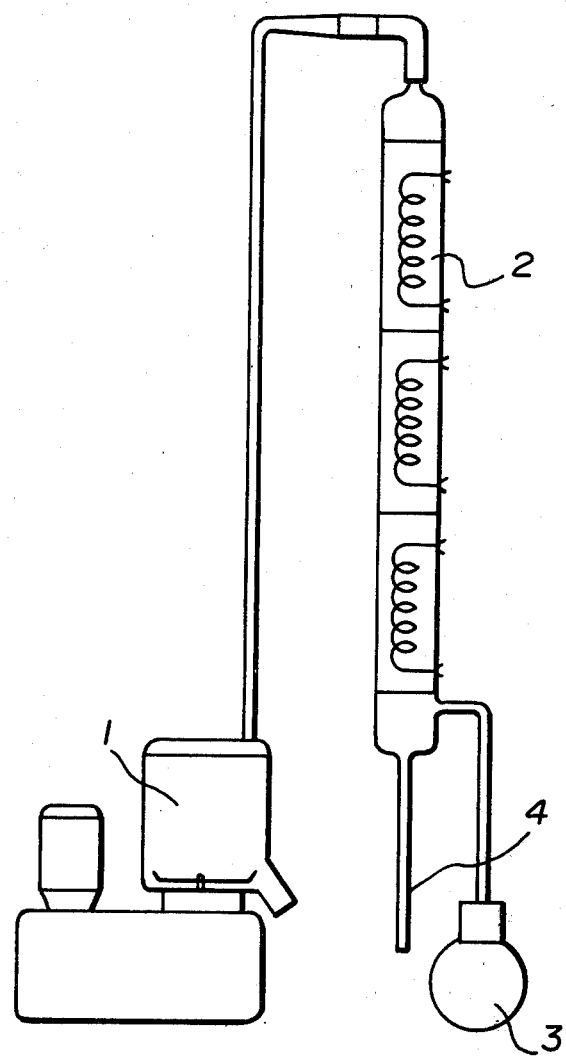
Figure 2:
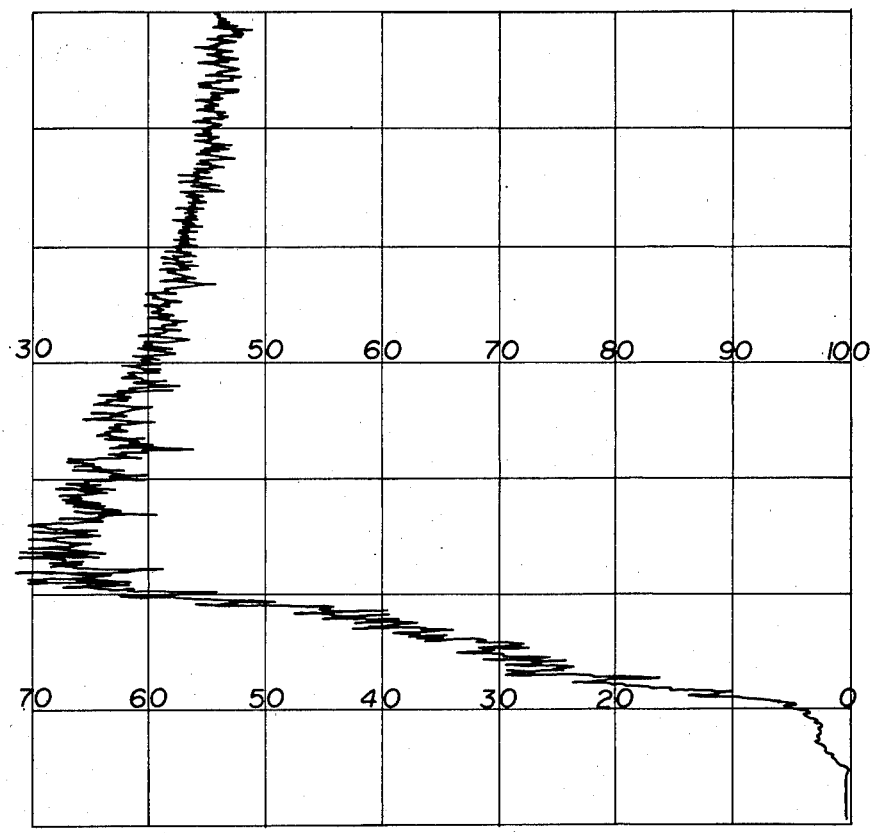
FIG. 2 illustrates the trace of development of Spring Top Patent flour and is included for comparison purposes.
Figure 3:
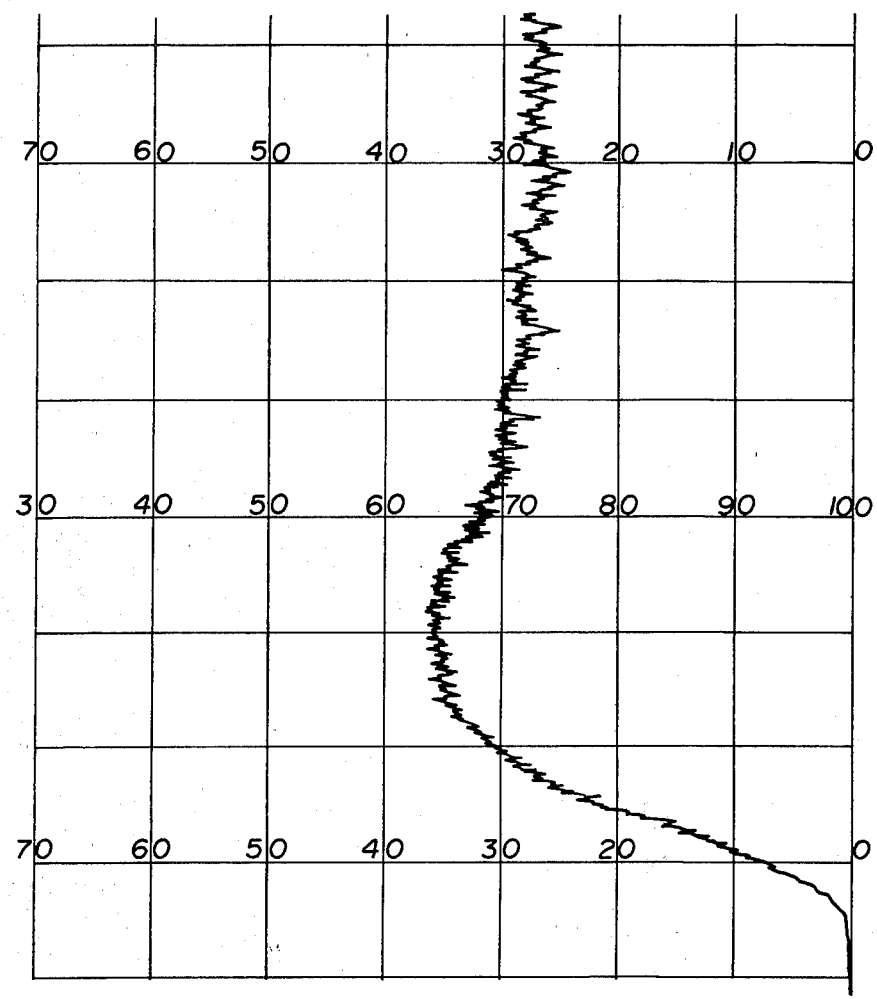
FIG. 3 shows the viscosity changes of a dough including Durum Semolina flour and is also presented for comparison purposes.
Figure 4:
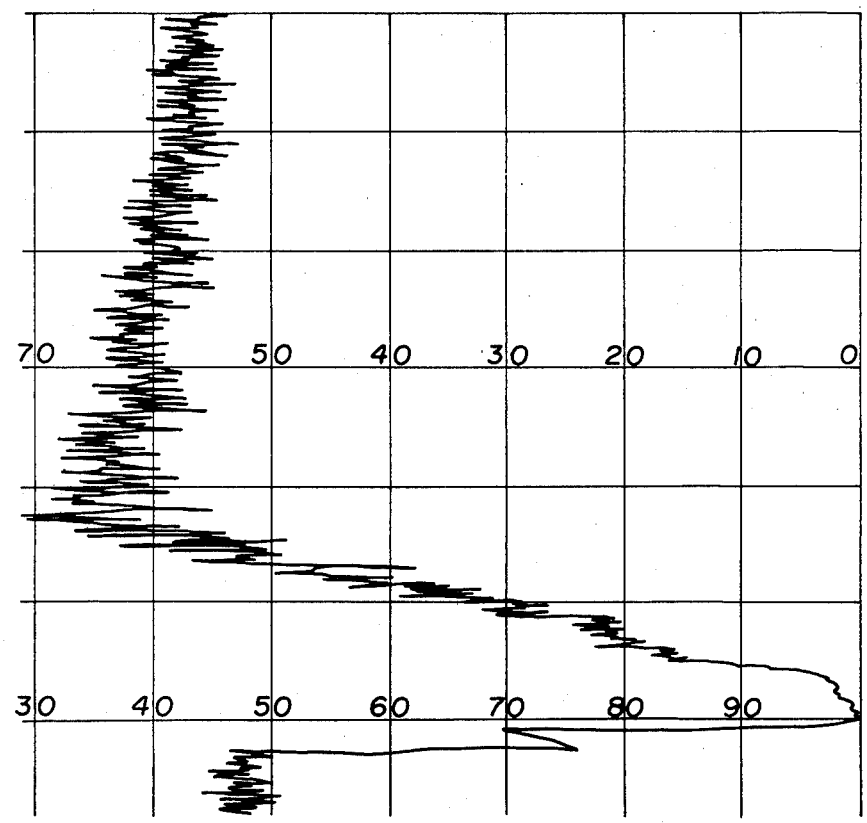
FIG. 4 shows the development of a dough incorporating regular ring dried vital gluten which development closely resembles that of the dough of FIG. 1.
Figure 5:
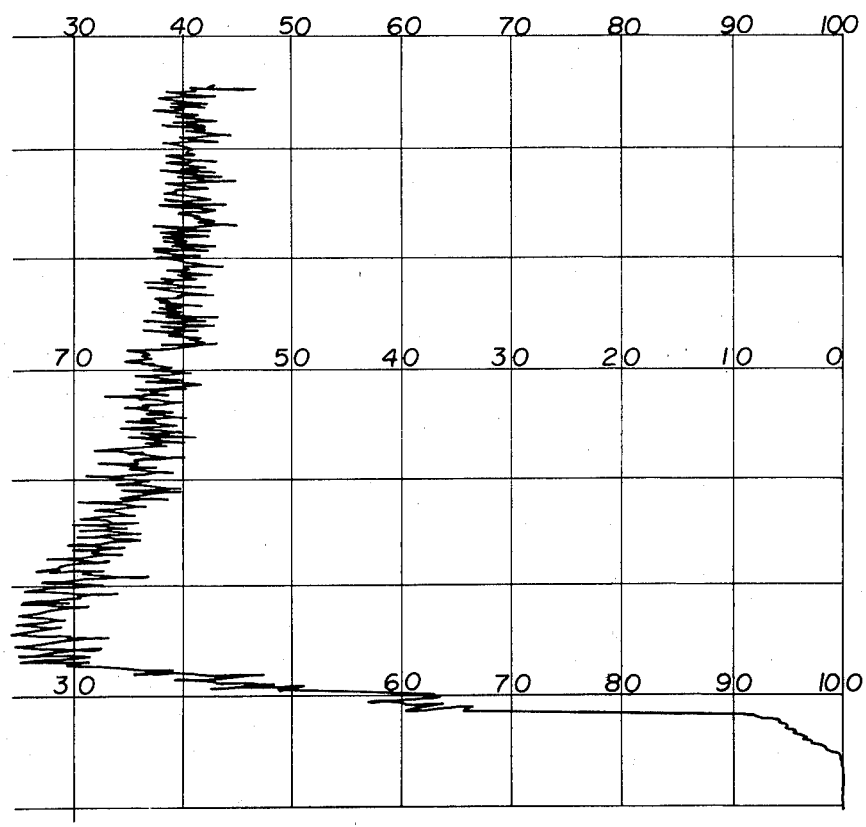

FIG. 5 represents a model dough including therein the gluten product of this invention. The carrier, hydrophobic liquid was cottonseed oil and the emulsifier level in the oil was 1% by weight. The carrier oil was extracted such that the gluten contained 8.5% residual oil by weight. The rate of development is somewhat faster than that of regular vital gluten (cf FIG. 4).

Figure 6:
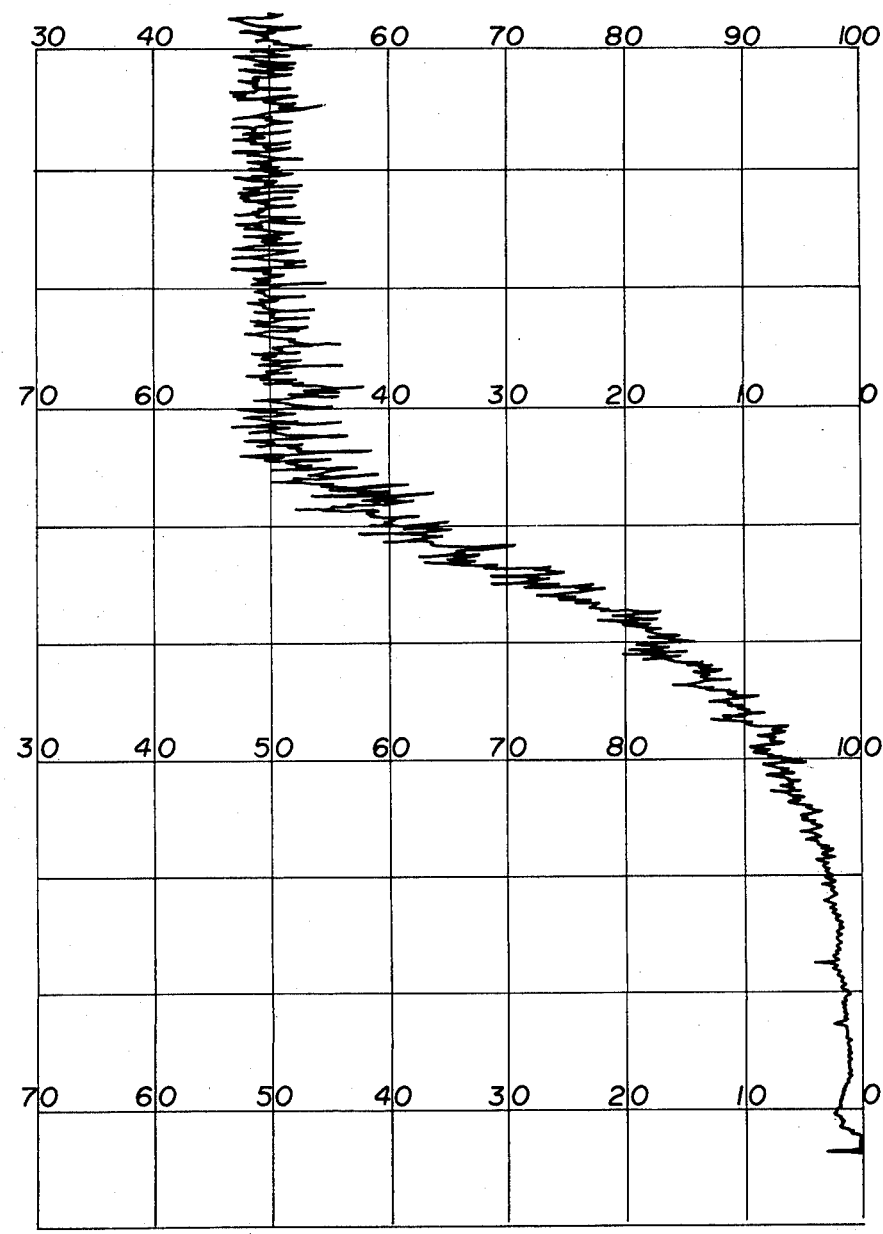

FIG. 6 shows the rate of development of the dough system identical to that of FIG. 4 except that 2% ("bone dry solids" basis) corn oil was added to the system to more accurately simulate the in vivo systems wherein most dough systems include added oil or shortening. As seen from FIG. 6, the addition of the corn oil significantly reduced the rate of development of regular production ring dried vital gluten. As well, the final viscosity of this dough system was substantially less than exhibited by the same system without added corn oil (refer to FIG. 4).

Figure 7:
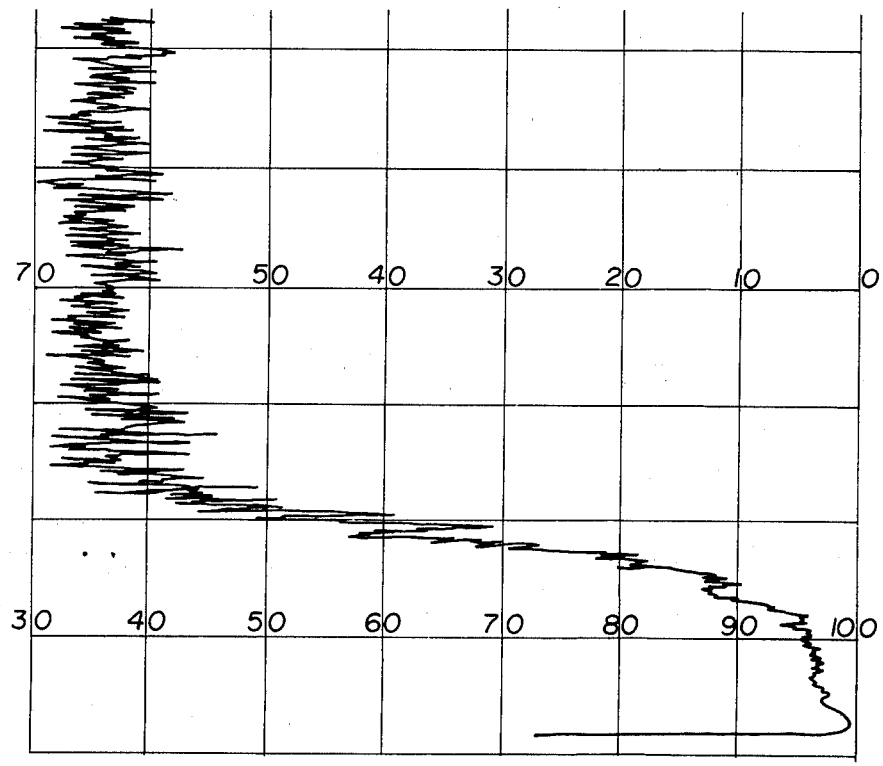

FIG. 7 shows the result of adding the 2% corn oil to the model dough system incorporating the product of the present invention (see FIG. 5). In comparison to the system using regular vital gluten plus the 2% added oil (FIG. 6), it is clearly evident that while there is about a one minute delay in the onset of development, the rate thereafter is very rapid. In addition, the final viscosity was much more acceptable as well.

B. Bake Tests

The baking tests were carried out as follows: Procedure

| (a) Formula | Parts (by weight) |
|---|---|
| Flour (Glenrose) | 400 |
| Shortening | 12 |
| Sugar | 16 |
| Salt | 8 |
| $(NH_4)_2SO_4$ | 1 |
| Water | 199 |
| Yeast | 16 |
| Ascorbic Acid | 4 |
| | 4 |
| $KBRO_3$ | 12 |
| Delpromase (maturing agent available from Delmar Chemicals Limited) | 2 |
| Gluten sample | 8 |
| Procedure | |
| Mixing Time | 30 sec. speed 1; 120 sec. speed 3 (Hobart with Duffy Bowl) |
| Rest | 10 min. @ 86° F. |
| Scale | 275 g |
| Rest | 10 min. @ 86° F. |
| Moulding on B & B | |
| Proof | 90 min. @ 116° F. |
| Bake | 19 min. @ 425° F. |
| Cool for one (1) hour and record | |
| Results | |

The results of the baking tests are summarized in Table I below, wherein the specific volumes (measured by standard procedures) of sample loaves of bread are shown listed beside the type of gluten preparation used in the dough formulation.

| Type of Gluten | Specific Volume (cc/gm) |
| --- | --- |
| (a) regular vital gluten (control) | 8.6 |
| (b) gluten composition of the present invention containing about 1% residual carrier oil | 8.9 |
| (c) gluten composition of the present invention containing about 13% residual carrier oil | 9.2 |

The above data indicate the gluten composition of the present invention having about 1% residual carrier oil content provides a small increase in specific volume compared to the control value (compare b to a). The gluten composition of the present invention containing about 13% residual carrier oil exhibiting a substantial increase in specific volume, i.e. increased functionality (compare c to a).

What is claimed is:

1. A process for preparing a substantially odorless and tasteless vital wheat gluten comprising treating vital wheat gluten by (a) dispersing wet vital gluten in a food-grade hydrophobic liquid in the presence of an effective amount of an edible emulsifier to effect a final stable dispersion, the ratio of hydrophobic liquid to gluten solids being from 15:1 to 7:1 by weight, said wet vital gluten being comprised of at least 55 percent moisture, (b) reducing the pressure to at least about 28" Hg of vacuum and elevating the temperature to at most 65° C., such treatment continuing for a period sufficient to dehydrate and render the gluten substantially odorless and tasteless, and (c) thereafter separating the so-treated gluten from the hydrophobic liquid.

2. A process as claimed in claim 1 wherein said treatment continues for from 25 to 40 minutes.

3. A process as claimed in claim 1 or 2 wherein its elevated temperature is up to 60° C.

4. A process as claimed in claim 1 or 2 wherein the pressure is reduced during formation of the dispersion and continues during elevation of the temperature.

5. A process as claimed in claim 1 or 2 wherein said wet gluten comprises from 65 to 80 percent moisture.

6. A process as claimed in claim 1 wherein the emulsifier is present in the amount of about 1 percent by weight based on the weight of hydrophobic liquid.

7. A process as claimed in claim 1 or 2 wherein the ratio of hydrophobic liquid to gluten solids is about 9:1 by weight.

8. A dry modified vital wheat gluten composition, which is substantially odorless and tasteless, comprising vital gluten treated by the process of dispersing wet vital gluten in a food-grade hydrophobic liquid in the presence of an effective amount of an edible emulsifier to effect a final stable dispersion, the ratio of hydrophobic liquid to gluten solids being from 15:1 to 7:1 by weight, said wet vital gluten being composed of at least 55 percent moisture, reducing the total pressure to at least about 28" Hg of vacuum and elevating the temperature at most 65° C. to, such treatment continuing for a period sufficient to dehydrate and render the gluten substantially odorless and tasteless and thereafter separating the so-treated gluten from the hydrophobic liquid.

9. A gluten composition as claimed in claim 8 wherein the gluten contains up to about 50 percent residual hydrophobic liquid.

10. The gluten composition as claimed in claim 8 wherein the residual moisture content is from about 6 to 10 percent by weight.

11. The gluten composition as claimed in claim 10 wherein the residual moisture content is about 8 percent by weight.

12. In a baking process wherein the dough is fortified by the addition of gluten, the improvement comprising adding to the dough a dry vital wheat gluten composition, which is substantially odorless and tasteless, comprising vital gluten treated by the process of dispersing wet vital gluten in a food-grade hydrophobic liquid in the presence of an effective amount of an edible emulsifier to effect a final stable dispersion, the ratio of hydrophobic liquid to solids being from 15:1 to 7:1 by weight said wet vital gluten being comprised of at least 55 percent moisture reducing the pressure to at least about 28" Hg and elevating the temperature to at most 65° C. such treatment continuing for a period sufficient to dehydrate and render the gluten substantially odorless and tasteless, and thereby separating the so-treated gluten from the hydrophobic liquid.

* * * * *